No. 652,525. Patented June 26, 1900.
F. A. STOHLMANN & L. G. PFARRE.
ARTERY FORCEPS.
(Application filed Mar. 6, 1900.)
(No Model.)

WITNESSES:
Gustave Dieterich
Geo E Mase

INVENTORS
Frederick A. Stohlmann
Louis G. Pfarre
BY Briesen & Knauth
ATTORNEYS

UNITED STATES PATENT OFFICE.

FREDERICK A. STOHLMANN AND LOUIS G. PFARRE, OF NEW YORK, N. Y.

ARTERY-FORCEPS.

SPECIFICATION forming part of Letters Patent No. 652,525, dated June 26, 1900.

Application filed March 6, 1900. Serial No. 7,467. (No model.)

*To all whom it may concern:*

Be it known that we, FREDERICK A. STOHLMANN and LOUIS G. PFARRE, residents of New York, in the borough of Brooklyn, county of Kings and State of New York, have invented certain new and useful Improvements in Artery-Forceps, of which the following is a specification.

Our invention relates to "artery-forceps," within which term we mean likewise to include artery-clamps.

The invention will be described herein, reference being had to the accompanying drawings, with the understanding, however, that the accompanying drawings show but one form of device in which our invention may be clothed.

The characteristic features of the invention will be claimed at the end of the specification.

Figure 1:
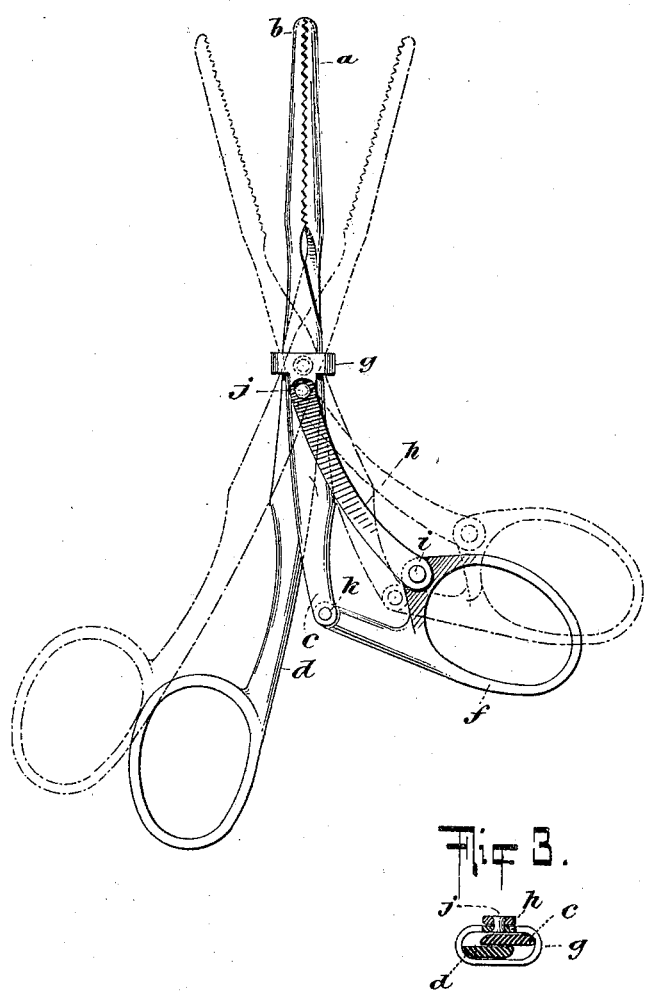
Figure 2:
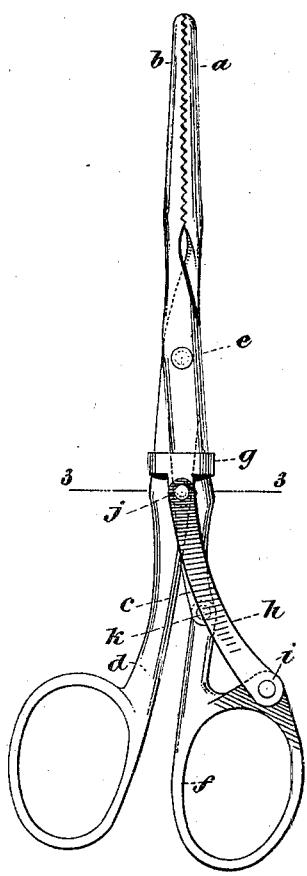
Figure 3:
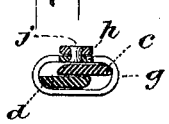

In the drawings, Figure 1 is a side elevation of the structure, showing the same in position to be opened and closed, the full-line position showing the device closed and the dotted-line position showing the same opened. Fig. 2 shows the device closed and locked; and Fig. 3 is a section on line 3 3 of Fig. 2, showing the relative positions of the various parts of the structure.

In the drawings, $a$ and $b$ are the jaws of the clamp, the jaw $a$ being provided with the usual operating lever or handle $d$ and the jaw $b$ being provided with the operating lever or handle $c$. The two jaw and handle structures are pivoted at $e$ after the manner of scissors. The operating-lever $c$ has hinged thereto a handle $f$. A slide or collar $g$ embraces the jaws and is freely slidable thereon, the sliding movement being effected by means of the link $h$, which is pivoted to the operating-handle $f$ at the point $i$ and to the collar at the point $j$. When the parts are in the position shown in Fig. 1—that is to say, when the operating-handle $f$ is swung on the pivot $k$, by which it is united to the lever or handle $c$—the jaws may be freely opened and closed, as shown by the dotted and full line positions of the parts in Fig. 1. When, however, the operating-handle $f$ is swung on its pivot to bring the parts into the position shown in Fig. 2, wherein the link $h$ very closely approaches the pivotal point $k$, the collar $g$ will be slid down upon the operating arms or levers $c$ $d$ of the jaws and will thereby hold the jaws firmly closed, so that the said jaws will remain closed until again opened by swinging the parts into the dotted-line position shown in Fig. 1. The utility of the device will be obvious to those skilled in the art without further comment—that is to say, the device is capable of very many uses in surgery other than the function named, and the invention is thus not limited to an artery-forceps.

Having described our invention, what we claim, and desire to secure by Letters Patent, is—

1. In artery-forceps, the combination of a plurality of jaws pivoted together and operated after the manner of scissors, operating-levers therefor, a slide embracing the operating means for the jaws and adapted to hold the same in place when the clamps are closed and a connection between the slide and the operating means for the jaws whereby the said operating means will perform the double function of operating the jaws and locking the same by positioning the slide.

2. In artery-forceps, the combination of a pair of jaws pivoted together, operating-levers therefor and a slide embracing the said operating-levers and a link connection intervening between the slide and an operating-handle for one of the operating-levers, substantially as described and for the purposes set forth.

3. In an artery-clamp, the combination of a plurality of jaws pivoted together, operating-levers therefor, a slide $g$ embracing said operating-levers, an operating-handle $f$ hinged to one of the operating-levers and a pivotal link connection intervening between the operating-handle and the slide, substantially as described and for the purposes set forth.

4. In an artery-forceps the combination of a plurality of grasping-jaws, operating-levers therefor pivoted together, means for locking the structure in the closed position, and a link connection pivotally engaged with an operating-lever and also pivotally engaged with the locking means for the structure substantially as described.

FREDERICK A. STOHLMANN.
LOUIS G. PFARRE.

Witnesses:
GEO. E. MORSE,
OTTO V. SCHRENK.